US010814739B2

(12) United States Patent
Molina et al.

(10) Patent No.: US 10,814,739 B2
(45) Date of Patent: Oct. 27, 2020

(54) MULTIPLE STORAGE SYSTEM AND METHOD FOR OPERATING A MULTIPLE STORAGE SYSTEM (71) Applicant: Bayerische Motoren Werke Aktiengesellschaft, Munich (DE)

(72) Inventors: Vincent Molina, Munich (DE); Andre Schmitz, Munich (DE); Pablo Fritzsche, Herrsching (DE); Frank Bauer, Munich (DE); Hajo Meinert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 205 days.

(21) Appl. No.: 15/982,828

(22) Filed: May 17, 2018

(65) Prior Publication Data

US 2018/0264968 A1 Sep. 20, 2018

Related U.S. Application Data (63) Continuation of application No. PCT/EP2016/077710, filed on Nov. 15, 2016.

(30) Foreign Application Priority Data

Nov. 18, 2015 (DE) .................. 10 2015 222 750

(51) Int. Cl.
*B60L 58/12* (2019.01)
*B60L 58/20* (2019.01)
*B60L 58/22* (2019.01)

(52) U.S. Cl.
CPC .............. *B60L 58/12* (2019.02); *B60L 58/20* (2019.02); *B60L 58/22* (2019.02);
(Continued)

(58) Field of Classification Search
CPC ......... B60L 58/12–15; B60L 58/18–22; B60L 50/40; B60L 50/60–61; Y02T 10/7066
See application file for complete search history.

(56) References Cited

U.S. PATENT DOCUMENTS

2004/0189226 A1 9/2004 King
2008/0218104 A1 9/2008 Lukic et al.
(Continued)

FOREIGN PATENT DOCUMENTS

CN 1265534 A 9/2000
CN 101828315 A 9/2010
(Continued)

OTHER PUBLICATIONS

English machine translation corresponding to DE102008054885 published Jun. 24, 2010. (Year: 2010).*
(Continued)

*Primary Examiner* — Rexford N Barnie
*Assistant Examiner* — David A Shiao
(74) *Attorney, Agent, or Firm* — Crowell & Moring LLP (57) ABSTRACT A method operates a storage system for a vehicle. The storage system has a first storage module and a second storage module for providing electrical energy to or for receiving electrical energy from a distribution network. The distribution network is coupled to an electrical motor of the vehicle. The first storage module is coupled by a direct current voltage converter to the distribution network. The method determines whether an amount of a voltage difference between a power supply voltage of the distributor network and a first storage voltage of the first storage module is equal to or less than a voltage threshold value. The method carries out one or more measures for increasing the (Continued)

amount of the voltage difference when it is determined that the amount is equal to or less than the voltage threshold value.

16 Claims, 1 Drawing Sheet

(52) U.S. Cl.
CPC ....... *B60L 2210/12* (2013.01); *B60L 2210/14* (2013.01); *B60L 2260/20* (2013.01); *Y02T 10/7005* (2013.01); *Y02T 10/7044* (2013.01); *Y02T 10/7061* (2013.01); *Y02T 10/7066* (2013.01); *Y02T 10/7225* (2013.01); *Y02T 10/7233* (2013.01)

(56) References Cited

U.S. PATENT DOCUMENTS

| | | | |
|---|---|---|---|
| 2009/0212626 A1* | 8/2009 | Snyder | B60K 6/448 307/10.1 |
| 2010/0133913 A1 | 6/2010 | Iida | |
| 2011/0084648 A1* | 4/2011 | Cao | H01M 10/44 320/103 |
| 2011/0100735 A1 | 5/2011 | Flett | |
| 2012/0181954 A1 | 7/2012 | Seibert et al. | |
| 2014/0055094 A1 | 2/2014 | Takagi et al. | |
| 2014/0067183 A1* | 3/2014 | Sisk | B60L 50/66 701/22 |
| 2014/0354040 A1 | 12/2014 | Reichow et al. | |
| 2017/0264136 A1 | 9/2017 | Schindler et al. | |

FOREIGN PATENT DOCUMENTS

| | | | | |
|---|---|---|---|---|
| CN | 103518303 A | | 1/2014 | |
| CN | 104768791 A | | 7/2015 | |
| DE | 10 2006 004 267 A1 | | 8/2007 | |
| DE | 10 2006 017 921 A1 | | 10/2007 | |
| DE | 10 2008 057 885 A1 | | 5/2010 | |
| DE | 102008054885 A1 | * | 6/2010 | ............ H02J 7/1438 |
| DE | 10 2009 031 295 A1 | | 1/2011 | |
| DE | 10 2011 086 829 A1 | | 5/2013 | |
| DE | 10 2014 223 971 A1 | | 5/2016 | |
| JP | 2010-115026 A | | 5/2010 | |

OTHER PUBLICATIONS

German Search Report issued in counterpart German Application No. 10 2015 222 750.2 dated Jul. 7, 2015 with partial English-language translation (Seventeen (17) pages).

International Search Report (PCT/ISA/210) issued in PCT Application No. PCT/EP2016/077710 dated Feb. 1, 2017 with English-language translation (Seven (7) pages).

German-language Written Opinion (PCT/ISA/237) issued in PCT Application No. PCT/EP2016/077710 dated Feb. 1, 2017 (Eight (8) pages).

Chinese-language Office Action issued in Chinese Application No. 201680059547.6 dated Jul. 23, 2020 with English translation (15 pages).

* cited by examiner

MULTIPLE STORAGE SYSTEM AND METHOD FOR OPERATING A MULTIPLE STORAGE SYSTEM

CROSS REFERENCE TO RELATED APPLICATIONS

This application is a continuation of PCT International Application No. PCT/EP2016/077710, filed Nov. 15, 2016, which claims priority under 35 U.S.C. § 119 from German Patent Application No. DE 10 2015 222 750.2, filed Nov. 18, 2015, the entire disclosures of which are herein expressly incorporated by reference.

BACKGROUND AND SUMMARY OF THE INVENTION

The invention relates to a method and a corresponding control unit for operating a multiple storage system for an electrically driven vehicle. The invention relates furthermore to a multiple storage system for an electrically driven vehicle.

A vehicle having an electric drive typically comprises one or more electrical storage modules for storing electrical energy for the operation of an electrical drive machine. In this case, electrical energy is drawn from the one or more electrical storage modules in order to drive the vehicle. Furthermore, in deceleration phases of the vehicle, electrical energy is typically recuperated in order to charge the one or more electrical storage modules.

The storage modules of the vehicle should, on the one hand, be sufficiently charged to make reliable driving possible. On the other hand, at least one of the storage modules should have sufficiently free capacity in recuperation phases to absorb the recuperated electrical energy and thus to facilitate the most efficient possible driving. The states of charge of the storage modules of an electrically driven vehicle should therefore be continuously monitored and, where necessary, adjusted.

The present document deals with the technical object of providing the most efficient and reliable possible electrical storage system having a multiplicity of electrical storage modules and the most efficient and reliable possible control or regulation of such a multiple storage system.

One aspect describes a method for operating a storage system for a vehicle (in particular for an electrically driven motor vehicle, such as, for example, an automobile, a utility vehicle, a truck, a bus, a motorcycle, etc.). The storage system comprises a first storage module and a second storage module for providing electrical energy to or for absorbing electrical energy from a distribution network. The distribution network is in this case coupled to an electric machine of the vehicle. The vehicle can be driven or accelerated by the electric machine. On the other hand, in a deceleration phase of the vehicle, the electric machine can be operated as a generator in order to recuperate electrical energy. In the distribution network, electrical power can therefore be requested by the electric machine (to drive the electric machine). On the other hand, electrical power can be provided by the electric machine in the distribution network (in a recuperation phase).

The first storage module is coupled to the distribution network via a DC voltage converter (also referred to in this document as a DC/DC converter). On the other hand, the second storage module can be coupled to the distributor network directly (without using a DC voltage converter). The discharge power (in a drive phase) and the charging power (in a deceleration phase), respectively, of the distributor network can be divided among the first storage module and the second storage module by suitably controlling or regulating the DC voltage converter. In this case, the method described in this document makes it possible to divide the charging and discharge power in a robust manner, even without using a dedicated DC voltage converter for the second storage module.

The first storage module and the second storage module can comprise a power store and an energy store. In this case, the power store has a higher maximum possible charging power and/or discharge power compared to the energy store. One example of a power store is a capacitor (in particular a so-called supercap). Alternatively or in addition, an Li-ion storage cell designed for power can be used as the power store. The energy store has a higher energy density and a higher storage capacity compared to the power store. One example of an energy store is an Li-ion-based storage cell or a storage module having a multiplicity of such storage cells. Different types of storage modules can therefore be used in the storage system in order to fulfill different requirements. In particular, by using a power store, specific requirements in relation to the acceleration and/or the deceleration behavior of the vehicle can be fulfilled. On the other hand, requirements for the range of the vehicle can be fulfilled by the energy store.

Preferably, the first storage module comprises the energy store and the second storage module comprises the power store. It is thus possible for the maximum possible charging/discharge power of the power store with respect to the distribution network not to be limited by properties, in particular power limits, of the DC voltage converter. The acceleration and/or the deceleration behavior of the vehicle can therefore be improved. On the other hand, the first storage module can comprise the power store and the second storage module can comprise the energy store. This can be advantageous with respect to the energy efficiency of the vehicle, since, on account of the relatively low storage capacity of the power store (in comparison with the energy store), cumulative losses of the DC voltage converter can be reduced when said DC voltage converter is used in conjunction with the power store.

The method comprises determining whether a magnitude of a voltage difference between a network voltage of the distributor network and a first storage voltage of the first storage module is equal to or less than a voltage threshold value. In this case, the voltage threshold value can have a fixed, predefined value. Moreover, the method comprises carrying out one or more measures to increase the magnitude of the voltage difference when it is determined that the magnitude is equal to or less than the voltage threshold value.

It is therefore possible, by operating the DC voltage converter in accordance with the described method, to ensure that the magnitude of the voltage difference between the network voltage and the first storage voltage does not fall below the voltage threshold value. This therefore makes it possible to use a pure step-up converter (boost converter) or a pure step-down converter (buck converter) as the DC voltage converter (or a bidirectional DC voltage converter) and thus to implement a multiple storage system for a vehicle in a cost-effective manner. In particular, when using a step-up converter, it can be ensured that the network voltage is always higher (by at least the voltage threshold value) than the first storage voltage. On the other hand, when using a step-down converter, it can be ensured that the network voltage is always lower (by at least the voltage threshold value) than the first storage voltage. It can thus be guaranteed that the first storage module can always provide a discharge power or absorb a charging power in a reliable and robust manner.

The one or more measures can comprise adjusting the division of a present load, in particular a present discharge power or charging power, of the first storage module and of a present load, in particular a present discharge power or charging power, of the second storage module based on an electrical power requested or provided in the distribution network. In other words, it is possible to adjust the portion of electrical power generated or absorbed by the first and by the second storage module, respectively. It is thus possible to adjust the state of charge of the first and of the second storage module, respectively, and hence the first storage voltage and the second storage voltage, respectively, (which typically corresponds to the network voltage). Alternatively or in addition, the one or more measures can comprise transferring electrical energy between the first storage module and the second storage module. Alternatively or in addition, the one or more measures can comprise limiting a present discharge power or charging power of (only) one of the two storage modules (wherein the present discharge power or charging power of the respective other storage module is not limited).

The method can comprise determining that electrical power is requested or provided in the distribution network. Furthermore, the method can comprise controlling the DC voltage converter in such a way that the electrical power is provided or absorbed to a greater extent by the power store. The acceleration and/or the deceleration behavior of the vehicle can thus be improved (since the power store typically has a higher charging and discharge power).

The method can comprise determining that a cumulative historical and/or previous load of the power store has reached or exceeded a load threshold value. In this case, the load threshold value can be selected in such a way that, when the load threshold value is reached, reduction of the maximum possible discharge power is not yet required (that is to say that derating is not yet required) in order to prevent damage to the power store. On the other hand, the load threshold value can indicate that derating could be necessary in the case of a further unchanging load of the power store.

It can be further determined that (in the abovementioned case) electrical power is provided in the distribution network (for example in a deceleration phase or recuperation phase of the vehicle). The DC voltage converter can then be controlled in such a way that a present charging power of the power store for absorbing the electrical power provided in the distribution network is reduced compared to a maximum possible charging power of the power store. Thus, in a recuperation phase, the load of the power store can be reduced in order to guarantee unrestricted operation of the power store in a subsequent discharge phase and hence unrestricted acceleration behavior of the vehicle. Such an operating strategy of the storage system can be used, in particular, in an activated sport mode of the vehicle.

The method can comprise determining a driving mode from a multiplicity of driving modes in which the vehicle is currently being operated. In this case, the multiplicity of driving modes can comprise a sport mode and a consumption-oriented mode. In this case, in the sport mode, the vehicle is typically intended to have an increased acceleration capability compared to the consumption-oriented mode. On the other hand, in the consumption-oriented mode, the vehicle is typically intended to have an increased electrical energy efficiency compared to the sport mode.

The DC voltage converter can be controlled depending on the driving mode. The abovementioned aims of the different driving modes can thus be implemented in an efficient manner.

In particular, in the sport mode, it is possible to prescribe, over a total driving speed range of the vehicle, a setpoint state of charge of the power store that is higher than the setpoint state of charge of the power store in the consumption-oriented mode. The DC voltage converter can then be controlled or regulated in such a way that the power store has the setpoint state of charge. An increased setpoint state of charge can guarantee that, in the sport mode, long and/or frequent acceleration phases can be implemented reliably.

On the other hand, the method can comprise, in particular when the vehicle is in the consumption-oriented mode, determining, in response to a request or provision of electrical power in the distribution network, the division of power between the first storage module and the second storage module, as a result of which the total power losses of the first storage module, of the second storage module and of the DC voltage converter are reduced (where necessary, minimized). The division of power can then be taken from a predefined look-up table (depending on the electrical power requested or provided in the distribution network). The DC voltage converter can then be controlled or regulated depending on the determined division of power. The energy efficiency of the storage system can thus be increased.

As stated above, the first storage module can comprise an energy store and the second storage module can comprise a power store. The method can comprise determining that an increased electrical power is requested or provided in the distribution network. In particular, a power transient can be detected. Such an increase in power typically requires a change of the operation of the DC voltage converter in order to convert an increased power. However, short increases in power can lead to loading of the DC voltage converter and of the first energy store and hence to a reduction in the lifetime. The method can therefore comprise limiting an increase in a power that can be converted by the DC voltage converter. The increase can be limited here in such a way that a non-converted remaining portion of the increased electrical power in the distribution network does not exceed a maximum discharge or charging power of the power store. The lifetime of the DC voltage converter and/or of the first energy store can thus be increased in a reliable manner.

In other words, by limiting the increase in a power command that controls the DC voltage converter, it is possible to achieve an improvement in the lifetime of the energy store and of the DC voltage converter. In this case, it should be guaranteed that the electrical power of the distribution network is not greater than the maximum power of the power store. The power swing of the DC voltage converter and of the energy store is thus reduced and hence the lifetime is increased. This function can also be utilized to adjust the dynamic response behavior of the electric drive of a vehicle.

A further aspect describes a storage system for a vehicle. The storage system comprises a first storage module and a second storage module for providing electrical energy to or for absorbing electrical energy from a distribution network, which is coupled to an electric machine of the vehicle. Moreover, the storage system comprises a DC voltage converter, which couples the first storage module to the distribution network. In this case, the DC voltage converter is configured to convert electrical energy between a first storage voltage of the first storage module and a network voltage of the distribution network. The DC voltage converter is preferably either a step-up converter or a step-down converter. Moreover, the storage system comprises a control unit, which is configured to execute the method for operating the DC voltage converter described in this document.

A further aspect describes a vehicle (in particular a motor-driven road vehicle, for example an automobile, a truck or a motorcycle), which comprises the storage system described in this document.

A further aspect describes a software (SW) program. The SW program can be configured to be executed on a processor (for example on one or more control devices of a vehicle), and to execute the method described in this document as a result.

A further aspect describes a storage medium. The storage medium can comprise an SW program, which is configured to be executed on a processor, and to execute the method described in this document as a result.

It should be noted that the methods, apparatuses and systems described in this document can be used both on their own and in combination with other methods, apparatuses and systems described in this document. Furthermore, any aspects of the methods, apparatuses and systems described in this document can be combined with one another in various ways. In particular, the features of the claims can be combined with one another in various ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
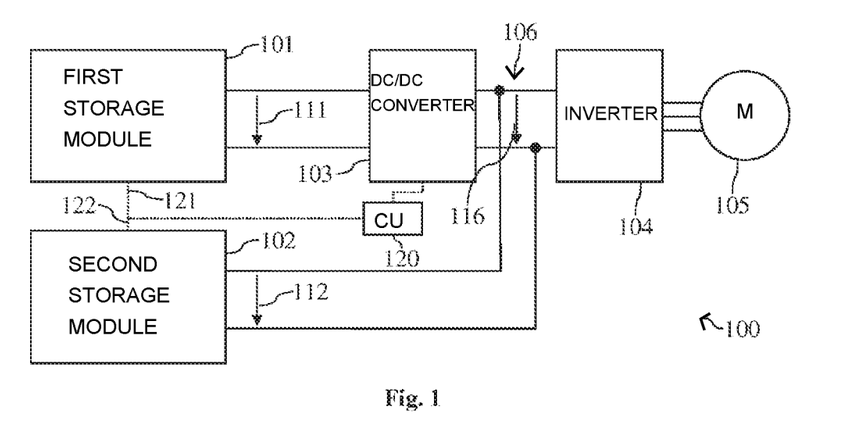
FIG. 1 is a block diagram of an exemplary system for driving an electrically driven vehicle.

As stated at the outset, the present document deals with the reliable and efficient provision of electrical energy in an electrically driven vehicle. In this connection, FIG. 1 shows a block diagram of a storage system 100 of an electrically driven vehicle. The system 100 comprises a first storage module 101 and a second storage module 102, which are both connected to an electrical distribution network 106. In this case, the first storage module 101 is connected to the distribution network 106 indirectly via a DC voltage converter 103 (also referred to as a DC/DC converter).

An inverter 104 is connected to the distribution network 106, said inverter being configured to generate an alternating current (in particular a three-phase current) from the direct current of the distribution network 106 for the purpose of operating an electric drive machine 105 of the vehicle. Conversely, the inverter 104 is configured to convert an alternating current generated by means of the electric machine 105 to a direct current, which can be used to be able to charge the first and/or the second storage module 101, 102.

The first storage module 101 has a first storage voltage 111 depending on the state of charge and the second storage module 102 has a second storage voltage 112 depending on the state of charge. In this case, the second storage voltage 112 in the system 100 illustrated in FIG. 1 corresponds to the network voltage 116 in the distribution network 106. The DC voltage converter 103 is configured to convert electrical energy at the first storage voltage 111 to electrical energy at the network voltage 116 (and in the reverse direction). In this case, for reasons of cost, it is typically advantageous when the DC voltage converter 103 is implemented either only as a step-up converter (that is to say as a boost converter) or only as a step-down converter (that is to say as a buck converter). In other words, the DC voltage converter 103 can be such that, for each direction of conversion, it can either only step-up or only step-down. This makes it possible to use cost-effective DC voltage converters 103. In the following text, it is assumed (without restriction) that the DC voltage converter 103 is a step-up converter, which, in one direction, can convert electrical energy at a relatively low first storage voltage 111 (only) to electrical energy at a relatively high network voltage 116, and which, in the reverse direction, can convert electrical energy at a relatively high network voltage 116 (only) to electrical energy at a relatively low first storage voltage 111.

Figure 2:
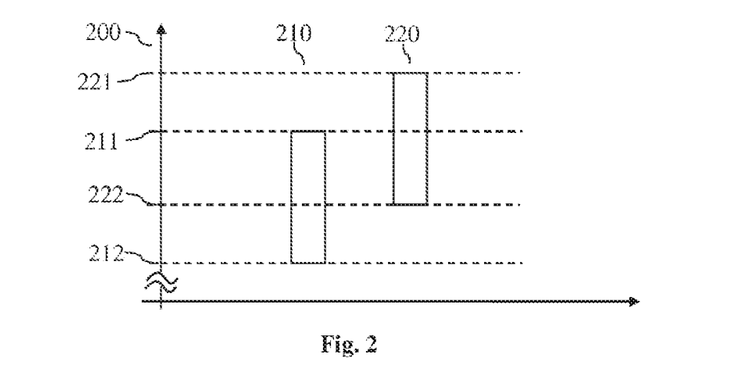
FIG. 2 is a graph of exemplary voltage ranges of storage systems.

The storage voltage 111, 112 of a storage module 101, 102 is typically dependent on the state of charge of the storage module 101, 102 and/or on the load in a discharge or charging process, due to the internal resistance. In this case, the voltage ranges 210, 220 for possible storage voltages 111, 112 can be different for different storage modules 101, 102. This is illustrated by way of example in FIG. 2. The first storage module 101 can have first storage voltages 111 from the first voltage range 210, at a minimum first storage voltage 212 (in the case of a minimum state of charge (SOC)) and a maximum first storage voltage 211 (in the case of a maximum state of charge). The second storage module 102 can have second storage voltages 112 from the second voltage range 220, at a minimum second storage voltage 222 (in the case of a minimum state of charge) and a maximum second storage voltage 221 (in the case of a maximum state of charge). In the example illustrated in FIG. 2, the maximum second storage voltage 221 is higher than the maximum first storage voltage 211. Typical storage voltages are in the range of 300 V, 500 V, 800 V or higher.

During operation of the system 100, the storage modules 101, 102 can have different states of charge. In particular, depending on requirements, the first storage module 101 and/or the second storage module 102 can be used to output energy or to absorb energy. For example, the first storage module 101 and the second storage module 102 can have different properties with respect to the energy density, to a maximum possible charging power, to a maximum possible discharge power, and/or to a storage capacity. For example, the first storage module 101 can have a store with a relatively high maximum charging/discharge power but with a relatively low energy density (for example a so-called supercap). The first storage module 101 can then preferably be used for acceleration phases and/or for recuperation phases. The first storage module 101 can in this case be referred to as a power store. On the other hand, the second storage module 102 can have a store with a relatively high energy density but a relatively low maximum charging/discharge power (for example an Li-ion battery). The second storage module 102 can then preferably be used for providing a basic power. The second storage module 102 can in this case be referred to as an energy store.

Electrical energy for the storage modules 101, 102 can be drawn or absorbed depending on the properties of the storage modules 101, 102, such that the storage modules 101, 102 can have different states of charge and hence also different storage voltages 111, 121. This could lead to a situation in which the network voltage 116 (which corresponds to the second storage voltage 102) is less than or equal to the first storage voltage 111. As a result thereof, energy would no longer be able to be withdrawn from or fed to the first energy store 111. A control unit 120 of the system 100 can be configured to recognize such a situation early and to introduce countermeasures even beforehand in order to ensure that the first storage voltage 111 is less than the network voltage 116 at any time. This can be achieved, in particular, by transferring electrical energy from the first storage module 101 to the second storage module 102. Alternatively or in addition, electrical energy can preferably be stored in the second energy module 102 in recuperation phases. The second storage voltage 112 can thus be raised relative to the first storage voltage 111.

Figure 3:
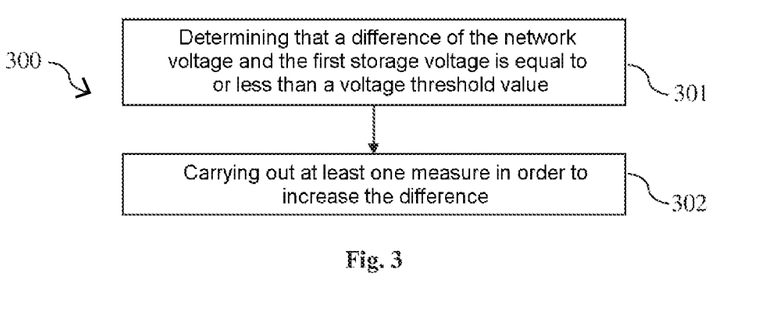
FIG. 3 is a flow chart of an exemplary method for operating a multiple storage system.

FIG. 3 shows a flow chart of an exemplary method 300 for operating a storage system 100 for a vehicle. The storage system 100 comprises a first storage module 101 and a second storage module 102 for providing electrical energy to or for absorbing electrical energy from a distribution network 106. In this case, the distribution network 106 is coupled to an electric machine 105 of the vehicle. The first storage module 101 is coupled to the distribution network 106 via a DC voltage converter 103. The second storage module 102 is preferably coupled directly to the distribution network 106. The method 300 can ensure that the provision and absorption of power by the storage modules 101, 102 can be controlled or regulated in a robust manner, even when using just one DC voltage converter 103. The method 300 furthermore makes it possible to use a pure step-up converter or a pure step-down converter as the DC voltage converter 103. Overall, therefore, the method 300 makes it possible to implement a cost-effective and robust multiple storage system for the electric drive of a vehicle.

The method 300 comprises determining 301 whether a magnitude of a voltage difference between a network voltage 116 of the distributor network 106 and a first storage voltage 111 of the first storage module 101 is equal to or less than a voltage threshold value. In particular, when using a step-up converter as the DC voltage converter 103, it is possible to determine whether or not the network voltage 116 is greater than the first storage voltage 111 by the voltage threshold value. On the other hand, when using a step-down converter as the DC voltage converter 103, it is possible to determine whether or not the network voltage 116 is less than the first storage voltage 111 by the voltage threshold value.

The method 300 further comprises carrying out 302 one or more measures to increase the magnitude of the voltage difference when it is determined that the magnitude is equal to or less than the voltage threshold value. In particular, it is possible to carry out one or more measures as a result of which the network voltage 116 is increased and/or the first storage voltage 111 is reduced (when using a step-up converter) or as a result of which the network voltage 116 is reduced and/or the first storage voltage 111 is increased (when using a step-up converter).

An energy storage system 100 having a plurality of storage modules 101, 102 is therefore described. Each storage module 101, 102 has one or more different properties that can be used specifically. For example, the first storage module 101 can primarily be suitable for supplying power, whereas the second storage module 102 can store slightly more energy. In the case of application in an electric vehicle, the first module 101 then offers slightly better provision of power, which can be used for vehicle acceleration. In contrast, the second storage module 102 can offer a slightly higher energy density, such that the electrical range of the vehicle can be maximized. In this case, it is also conceivable for a plurality of storage modules 101, 102 to be able to supply energy to a plurality of inverters/EM drives 104, 105 or to be able to absorb energy therefrom.

Different storage modules 101, 102 can therefore be provided for different applications. For example, some storage modules, such as supercaps, are designed for a relatively high provision of power, such that said storage modules can be charged and discharged at relatively high currents without damage. However, in such storage modules, the energy content is typically relatively low. Requests with respect to the electrical range of the vehicle can be fulfilled by an additional storage module, which can store a greater amount of electrical energy. A multiple storage system 100 can therefore provide both a relatively high performance and a relatively long range.

The control unit 120 of a multiple storage system 100 can draw on a multiplicity of functions in order to control or regulate the discharging or charging of the storage modules 101, 102. The control unit 120 can be, for example, part of a control device of a storage module 101, 102, of the DC voltage converter 103 and/or of the electric machine 105. For this purpose, the control unit 120 can use, in particular, the DC voltage converter 103 to control or to regulate the drawing of electrical energy from the first storage module 101 or the absorption of electrical energy by the first storage module 101. This indirectly influences the drawing/absorption of electrical energy by the second storage module 102. The control unit 120 can therefore set the drawing/absorption of electrical energy by the two storage modules 101, 102 by actuating the DC voltage converter 103.

Within the context of a first function, present power limits of the multiple storage system 100 can be determined by the control unit 120. As the input, said first function can use the maximum charging and/or discharge power of the storage modules 101, 102, the power loss of the DC voltage converter or converters 103 and/or the required storage system power, possibly including the secondary load, determined from the torque requested by the driver of the vehicle (in particular from the gas pedal position). The power loss of the DC voltage converter 103 in this case relates mostly to the requested state (that is to say to the required storage system power) or to the maximum state that can be achieved by the system 100 when the requested state cannot be reached.

The maximum possible discharge/charging powers of the storage modules 101, 102 can in this case vary over time. In particular, a historical load of a storage module 101, 102 can influence the presently maximum possible discharge/charging power of the storage module 101, 102. Alternatively or in addition, a driving mode of the vehicle (for example a sport mode or a consumption-oriented driving mode) can influence the presently maximum possible discharge/charging power of the storage module 101, 102. Alternatively or in addition, the storage voltage 111, 112 of a storage module 101, 102 relative to the network voltage 116 can influence the presently maximum possible discharge/charging power of the storage module 101, 102.

As the output, the first function can provide the maximum possible discharge and/or charging power of the entire energy storage system 100 resulting from the preceding loading of the storage modules 101, 102 and/or of the DC voltage converter 103. Furthermore, the maximum possible discharge and charging power can be provided to the individual storage modules 101, 102. In this case, the presently maximum possible discharge and charging powers for different storage modules 101, 102 can significantly differ from one another (for example on account of the properties of the storage modules 101, 102 and/or on account of the historical load of the storage modules 101, 102).

Within the context of a second function, the control unit 120 can determine power ranges for the individual storage modules 101, 102. As the input, the maximum possible charging/discharge power of the multiple storage system 100 (from the first function), the losses of the DC voltage converter 103 and/or the power limits of the individual storage modules 101, 102 can be taken into account. In this case, the determined power ranges of the individual storage modules 101, 102 can depend on the storage voltages 111, 112, on the network voltage 116 and/or on the present driving mode of the vehicle.

As the output, the presently maximum possible charging/discharge power of the DC voltage converter 103 can be provided by the second function. This value determines the maximum provision/absorption of power of the individual storage modules 101, 102 that can be set by regulating the DC voltage converter 103.

The presently maximum possible charging/discharge power of the DC voltage converter 103 determined by the second function can be used by the control unit 120 to control or to regulate the DC voltage converter 103. Alternatively, within the context of a third function, a differing provision/absorption of power of the energy modules 101, 102 can be set by means of the DC voltage converter 103, wherein the differing provision/absorption of power of the energy modules 101, 102 depends on an operating strategy. Within the context of the third function, a load can therefore be divided over the individual storage modules 101, 102.

The third function can use, for example, a PID controller to determine a power control signal for the DC voltage converter 103. Based on a comparison between the present energy content and a desired energy content in at least one of the storage modules 101, 102, a control signal for the DC voltage converter 103 can be determined. For this purpose, the storage modules 101, 102 can provide the control unit 120 with storage data 121, 122, which indicate, for example, a present state of charge or a present storage voltage 111, 112.

The DC voltage converter 103 can be actuated, for example, depending on a desired state of charge of the first energy module 101. The first energy module 101 can comprise a power store, for example. The maximum (and possibly the minimum) possible charging/discharge powers of the first energy store 101 are taken into account here.

The desired state of charge or the desired charging/discharge power of the first energy store 101 can depend on one or more operating strategies:

(a) The demand for power in the first energy store 101 can depend on the vehicle speed. The higher the vehicle speed, the lower the likelihood of acceleration being requested by the driver. There is therefore, typically at relatively high vehicle speeds, a reduced or no demand for an energy reserve in the first storage module 101 (that is to say in the power store). At a relatively high vehicle speed, the energy that can be recuperated is also typically relatively high. It can therefore be expedient to keep the first energy store 101 at a relatively low state of charge at relatively high vehicle speeds in order to be prepared to recuperate energy. In this case, a controller for actuating the DC voltage converter 103 can use a relatively low desired state of charge as the setpoint variable.

(b) On the other hand, it is typically highly likely that the driver of a vehicle requests a powerful acceleration at a relatively low speed. In this case, the controller can set a relatively high state of charge as the setpoint variable for the power store.

(c) The state of charge (or the setpoint energy) of the power store set by the controller can therefore be calculated based on the kinetic energy in the vehicle. Alternatively or in addition, the set state of charge can be determined based on the energy provided in the drive system (possibly reduced by efficiency losses in the chain between the storage module 101, 102 and the electric machine 105 and possibly taking into account the performance of the electric drive system). In this case, for example, data from an angle of inclination sensor can be taken into account. It is thus possible to calculate the energy that can be recuperated, which serves as a basis for determining a matrix at maximum powers, which result from a multiplicity of possible braking processes of different intensities. The brake pedal position then serves as the assignment of values in the matrix for the requested brake power.

(d) The desired charging power of the power store can depend on the driving mode. In the sport mode, the driver of a vehicle would typically like to drive dynamically. It is therefore highly likely that acceleration is requested even at a high driving speed. In this case, the desired state of charge can be set to be higher than in another driving mode (for example a consumption-oriented driving mode).

(e) In a consumption-oriented driving mode (for example in a so-called ECO mode), the power losses of the drive system are typically minimized. In this case, the desired state of charge of the first energy module 101 can be determined in such a way that the efficiency for the power absorption and power output are reduced, where appropriate minimized, for the entire multiple storage system 100 (including the losses of the DC voltage converter 103).

Within the context of a fourth function, the control unit 120 can monitor the storage voltages 111, 112 and the network voltage 116. As stated above, the DC voltage converter 103 can comprise a bidirectional DC/DC converter, which operates in one direction only as a boost converter and in the other direction only as a buck converter. In such DC/DC converters, energy can be transferred only when the voltage on the high side is higher than the voltage on the low side of the DC voltage converter 103. The fourth function can monitor these voltages and react when the voltages on the high side and the low side come too close to one another. For example, countermeasures can be initiated when the voltage difference between the network voltage 116 and the first storage voltage 111 falls below a predefined voltage threshold value.

Possible Countermeasures are:

a) Setting a maximum possible discharge power of the first energy module 101 (for example within the context of the third function) in order to discharge the second energy module 102 and increase the second storage voltage 112 (and hence the network voltage 116) relative to the first storage voltage 101.

b) Limiting the presently maximum possible discharge power of the second storage module 102 (within the context of the first function). As a result, the maximum possible system power is typically also reduced. The second storage module 102 can thus be discharged and the second storage voltage 112 can be increased (relative to the first storage voltage 111).

c) Making it possible to transfer charge from the first storage module 101 to the second storage module 102. The first storage voltage 111 is thus reduced and the second storage voltage 112 is thus increased.

All or some of the abovementioned measures a), b) and/or c) can be activated when it is determined that a voltage difference has fallen below a first threshold value. The measures a), b) and/or c) can be deactivated when it is determined that the voltage difference has risen again to above a second threshold value (which is greater than the first threshold value) and/or when it is determined that the voltage difference has been above the first threshold value for a minimum period and/or when the two storage modules 101, 102 are in a stable energy state, that is to say when the energy states (or SOCs) are set such that the voltage 106 on the output side of the DC voltage converter 103 is greater than the storage voltage 111 on the input side of the DC voltage converter 103 (when using a step-up converter as the DC voltage converter 103; the voltage levels are interchanged when using a step-down converter).

As already mentioned, the operation of the multiple storage system 100 can depend on a driving mode. In particular, when a sport mode is activated, a transfer of charge between the first energy store 101 and the second energy store 102 can be made possible in order to ensure that power reserves are sufficiently available in a power store of the system 100 (for acceleration phases). On the other hand, in a consumption-oriented driving mode, a transfer of charge can be prevented (as far as possible, except within the context of the abovementioned measure c), for example).

Alternatively or in addition, a presently maximum possible charging power of an energy module 101, 102 can depend on the driving mode. A great historical load of a storage module 101, 102 can lead to the limitation of the maximum possible discharge power at a present time. In other words, it can result in "derating" of a storage module 101, 102. In order to avoid such "derating" of a power store of the system 100, in the sport mode, the presently maximum possible charging power of the power store can be reduced as a precaution (for example depending on, in particular in proportion to, a load state of the power store). Where necessary, the recuperation can be dispensed with completely, that is to say that all of the energy can be translated to the wheel brakes and there is no charging by recuperation in any of the storage modules 101, 102. It is thus possible to prevent a situation in which the power store does not have a sufficient discharge power when required. Reliable implementation of a sport mode can thus be guaranteed.

A storage module 101, 102 can have a management unit, which is configured to determine and provide storage data 121, 122 with a multiplicity of state values with respect to a state of the storage module 101, 102. Exemplary state values are the present storage voltage 111, 121, a present current, a power prediction, a present state of charge or SOC, a current integral of a charging or discharge current as a load indicator, etc. Said storage data 121, 122 can be provided to the control unit 120.

The control unit 120 utilizes the storage data 121, 122 and subsequently controls or regulates the load distribution in a system 100 from (at least) two HV (high-voltage) storage modules 101, 102 that are coupled to one another. To reduce the costs, a bidirectional step-up converter can be used DC voltage converter 103. The control unit 120 can then be configured to ensure that it is ensured, at any time, that the input voltage 111 to the DC voltage converter 103 is less than the output voltage 116 of the DC voltage converter 103.

For this purpose, the control unit 120 can monitor the voltage and, when required, intervene in the provision of power to the two storage modules 101, 102.

In one example, the second storage module 102 can comprise a power store in order to be able to absorb and output power without limiting the power of the DC voltage converter 103. The first storage module 101 can then have an energy store. In this case, degradation of the power of the power store and a greater loading of the energy store can be carried out in response to the voltage monitoring (that is to say in response to too low a voltage difference). Alternatively or in addition, when a power reserve of the energy store is present, charge can be transferred to the power store (which is typically strictly prevented in the ECO mode). These measures can be carried out, in particular, in discharge phases (that is to say during accelerations). A voltage difference between the second storage voltage 112 and the first storage voltage 111 can thus be produced.

Alternatively or in addition, the operating strategy for a multiple storage system 100 executed by a control unit 120 can have further functions and regulating mechanisms.

Two different driving modes or operating modes can be taken into account, in particular a sport mode and an ECO mode. In the ECO mode, the transfer of charge between the storage modules 101, 102 can be prevented (where necessary except to ensure a voltage difference) in order to guarantee maximum efficiency of the multiple storage system 100. On the other hand, in the sport mode, transfer of charge can be permitted in order to guarantee maximum system performance for acceleration phases and/or recuperation phases.

In accordance with a further function, in the discharge process (in particular during acceleration), the power store is discharged first. A reference variable can in this case be the discharged energy in comparison to the energy that can be recuperated in the drive system. In this case, the reference variable can depend on the activated driving mode. Should the performance of the power store be insufficient for a power requirement, the energy store can also be discharged.

In this case, however, the voltage difference between the storage voltages 111, 112 typically has to be taken into account and an overlap of the voltage levels of the storage modules 111, 121 has to be prevented. An impending overlap of the voltage levels can lead to the discharge power of the power store (that is to say of the second storage module 102) being reduced and the discharge power of the energy store (that is to say of the first storage module 101) being increased. Furthermore, if the required system power is lower than the power of the energy store, energy can also be transferred (that is to say charge can be transferred) from the energy store to the power store (where necessary, even in the ECO mode).

In accordance with a further function, in the charging process (that is to say during braking), the power store can be charged first. Consequently, the power output (regulated according to the reference variable) of the acceleration phase can be recuperated in the recuperation phase. Should the performance be insufficient for the charging process of the power store, the energy store can also be charged.

In this case, however, the voltage difference between the storage voltages 111, 112 typically has to be taken into account and an overlap of the voltage levels of the storage modules 111, 121 has to be prevented. An impending overlap of the voltage levels can lead to the charging power of the energy store being reduced and the charging power of the power store being increased in the direction of the maximum. Furthermore, if the provided system power (recuperation power) is lower than the charging power of the power store, energy can also be transferred (that is to say charge can be transferred) from the energy store to the power store (where necessary, even in the ECO mode) for the recuperation power.

The charging process can be modified in the sport mode to the effect that, based on a load indicator for the storage modules 101, 102, for example based on a current integral of the storage modules 101, 102, a check is carried out as to whether the present charging power restricts a possible discharge power to be generated later and whether, without recuperation, sufficient energy is still available for power provision. If the check reveals that there is a restriction and there is sufficient energy, the charging of the two storage modules 101, 102 or of one storage module 101, 102 can be prevented or limited in a targeted manner. There is then no recuperation or only restricted recuperation. On the other hand, the readiness of power for accelerations can thus be ensured.

The multiple storage system 100 described in this document makes it possible to supply power to an electric drive machine 105 in different operating situations of an electrically driven vehicle in a cost-effective, energy-efficient and reliable manner. Measures for adjusting the voltages in the storage modules 101, 102 of the multiple storage system 100 have been described here. In particular, the measures comprise dividing the power in a multiple storage system 100 taking into account the properties (for example energy state/SOC, maximum/minimum power, previous load, etc.) of the storage modules 101, 102 and of the DC voltage converter 103 of the multiple storage system 100. It is thus possible to use a bidirectional DC voltage converter 103, which is designed either only as a step-up converter or as a step-down converter. Within these physical restrictions of the multiple storage system 100, there is a degree of freedom for the choice of the power division. The functions illustrated utilize said degree of freedom to optimize, for example, the following performance: maximum power available (for example for the acceleration phases); available energy/efficiency/range and/or lifetime of the multiple storage system 100.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a storage system for a vehicle, the storage system comprising a first storage module and a second storage module for providing electrical energy to or for absorbing electrical energy from a distribution network, wherein the distribution network is coupled to an electric drive machine of the vehicle, and wherein the first storage module is coupled to the distribution network via a DC voltage converter, the method comprising the acts of:
   determining whether a magnitude of a voltage difference between a network voltage of the distribution network and a first storage voltage of the first storage module is equal to or less than a voltage threshold value; and
   when it is determined that the magnitude is equal to or less than the voltage threshold value, increasing the magnitude of the voltage difference by adjusting a division of a present load of the first storage module and a present load of the second storage module based on an electrical power requested or provided in the distribution network, wherein the present load of the first storage module is a present discharge power or charging power, and the present load of the second storage module is a present discharge power or charging power.

2. The method as claimed in claim 1, wherein
   the first storage module comprises one of a power store and an energy store and the second storage module comprises the other one of the power store and the energy store;
   the power store has a higher maximum possible charging power and/or discharge power compared to the energy store; and
   the energy store has a higher energy density and a higher storage capacity compared to the power store.

3. The method as claimed in claim 2, wherein
   the first storage module comprises the energy store and the second storage module comprises the power store.

4. The method as claimed in claim 3, wherein the method further comprises the acts of:
   determining that electrical power is requested or provided in the distribution network; and
   controlling the DC voltage converter such that the electrical power is provided or absorbed to a greater extent by the power store.

5. The method as claimed in claim 4, wherein the method further comprises the acts of:
   determining that a cumulative foregone load of the power store has reached or exceeded a load threshold value;
   determining that electrical power is provided in the distribution network; and
   controlling the DC voltage converter such that a present charging power of the power store for absorbing the electrical power provided in the distribution network is reduced compared to a maximum possible charging power of the power store.

6. The method as claimed in claim 2, wherein the method further comprises the acts of:
   determining that electrical power is requested or provided in the distribution network; and
   controlling the DC voltage converter such that the electrical power is provided or absorbed to a greater extent by the power store.

7. The method as claimed in claim 2, wherein the method further comprises the acts of:
   determining that a cumulative foregone load of the power store has reached or exceeded a load threshold value;
   determining that electrical power is provided in the distribution network; and
   controlling the DC voltage converter such that a present charging power of the power store for absorbing the electrical power provided in the distribution network is reduced compared to a maximum possible charging power of the power store.

8. The method as claimed in claim 2, wherein
   the method comprises determining a driving mode from a multiplicity of driving modes in which the vehicle is currently being operated;
   the multiplicity of driving modes comprises a sport mode and/or a consumption-oriented mode; and
   the method further comprises controlling the DC voltage converter depending on the driving mode.

9. The method as claimed in claim 8, wherein
   in the sport mode, the vehicle is intended to have an increased acceleration capability compared to the consumption-oriented mode;

in the sport mode, a setpoint state of charge of the power store is higher over a total driving speed range of the vehicle than in the consumption-oriented mode; and the method further comprises controlling the DC voltage converter such that the power store has the setpoint state of charge.

10. The method as claimed in claim 9, wherein in the consumption-oriented mode, the vehicle is intended to have an increased electrical energy efficiency compared to the sport mode; and the method further comprises:

determining, in response to a request for or provision of electrical power in the distribution network, a division of power between the first storage module and the second storage module, as a result of which total power losses of the first storage module, of the second storage module and of the DC voltage converter are reduced; and controlling the DC voltage converter depending on the determined power division.

11. The method as claimed in claim 2, the method further comprising the acts of:

determining that an increased electrical power is requested or provided in the distribution network; and limiting an increase in a power that is convertable by the DC voltage converter such that a non-converted remaining portion of the increased electrical power does not exceed a maximum discharge or charging power of the power store.

12. The method as claimed in claim 1, wherein the method comprises determining a driving mode from a multiplicity of driving modes in which the vehicle is currently being operated;

the multiplicity of driving modes comprises a sport mode and/or a consumption-oriented mode; and the method further comprises controlling the DC voltage converter depending on the driving mode.

13. The method as claimed in claim 12, wherein in the consumption-oriented mode, the vehicle is intended to have an increased electrical energy efficiency compared to the sport mode; and the method further comprises:

determining, in response to a request for or provision of electrical power in the distribution network, a division of power between the first storage module and the second storage module, as a result of which total power losses of the first storage module, of the second storage module and of the DC voltage converter are reduced; and controlling the DC voltage converter depending on the determined power division.

14. The method as claimed in claim 1, wherein the magnitude of the voltage difference is also increased by one or more of transferring electrical energy between the first storage module and the second storage module, and limiting a present discharge power or charging power of one of the two storage modules.

15. A storage system for a vehicle, comprising:

a first storage module and a second storage module for providing electrical energy to or for absorbing electrical energy from a distribution network, which is coupled to an electric drive machine of the vehicle;

a DC voltage converter, which couples the first storage module to the distribution network, wherein the DC voltage converter is configured to convert electrical energy between a first storage voltage of the first storage module and a network voltage of the distribution network, and the DC voltage converter comprises either a step-up converter or a step-down converter; and a control unit, which is operatively configured to:

determine whether a magnitude of a voltage difference between a network voltage of the distribution network and a first storage voltage of the first storage module is equal to or less than a voltage threshold value; and when it is determined that the magnitude is equal to or less than the voltage threshold value, increase the magnitude of the voltage difference by adjusting a division of a present load of the first storage module and a present load of the second storage module based on an electrical power requested or provided in the distribution network, wherein the present load of the first storage module is a present discharge power or charging power, and the present load of the second storage module is a present discharge power or charging power.

16. The storage system as claimed in claim 15, wherein the magnitude of the voltage difference is also increased by one or more of transferring electrical energy between the first storage module and the second storage module, and limiting a present discharge power or charging power of one of the two storage modules.

* * * * *